UNITED STATES PATENT OFFICE.

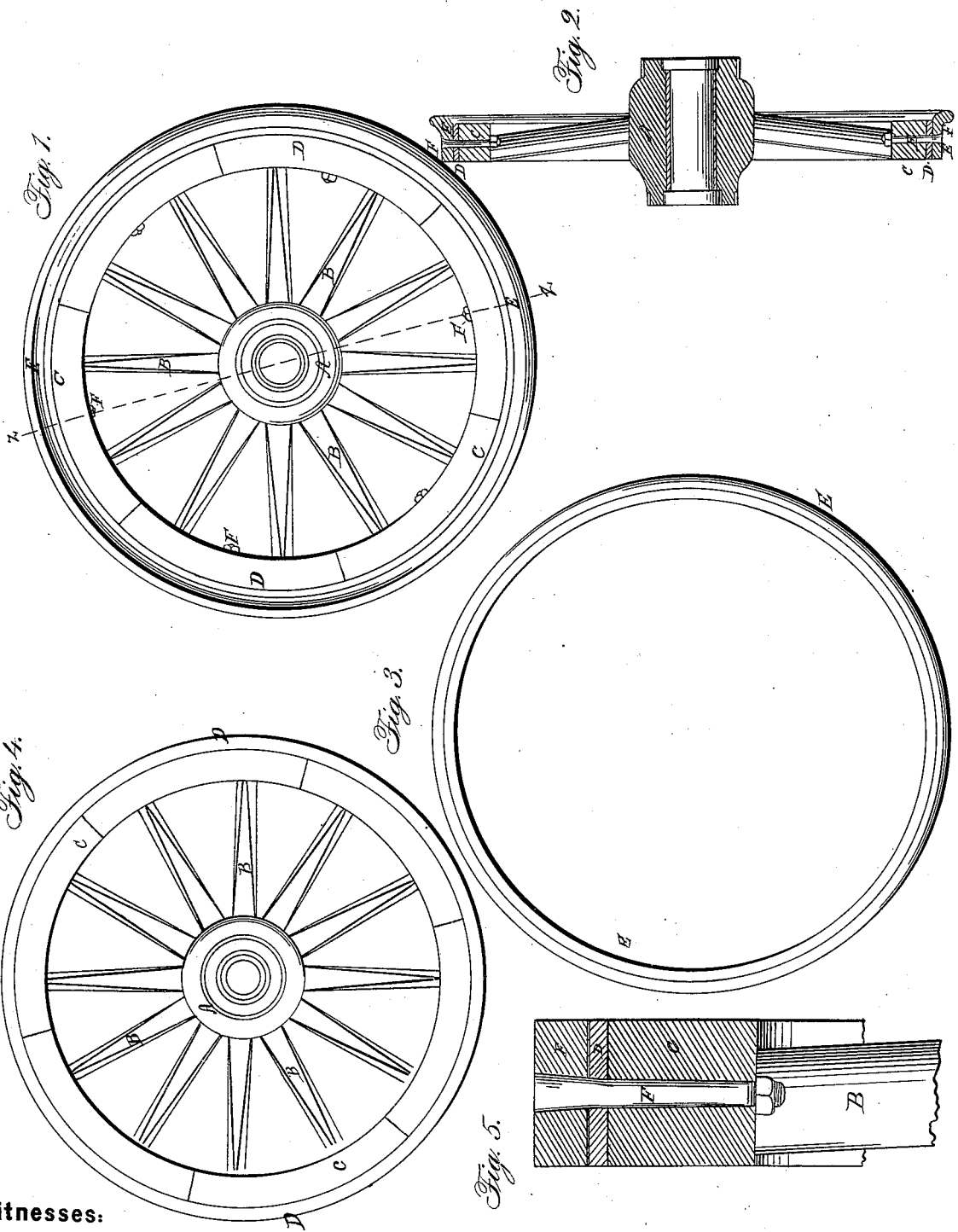

WALTER YOUMANS, OF WATERFORD, NEW YORK.

IMPROVEMENT IN CAR-WHEELS.

Specification forming part of Letters Patent No. 29,537, dated August 7, 1860.

*To all whom it may concern:*

Be it known that I, WALTER YOUMANS, of the village of Waterford, in the county of Saratoga and State of New York, have invented a certain new and useful Improved Car or Carriage Wheel; and I do hereby declare that the following is a full and exact description of the same, reference being had to the annexed drawings, which make a part of this specification, and in which—

Figure 1 is a side elevation of one of my improved car-wheels; Fig. 2, a cross-section of the same at the line $z\ z'$; Fig. 3, a side view of the outer tire of the wheel, and Fig. 4 an elevation of the wheel with the outer tire removed. Fig. 5 is a cross-section, on a larger scale than the other drawings, of the felly and double tires of one of my improved coach or carriage wheels.

The same letters of reference indicate like parts in all the figures.

My improved car, coach, or wagon wheel consists of a wooden hub A, wooden spokes B, a wooden felly C, and two metallic rings or tires D and E, the wooden hub, spokes, and felly being formed and put together essentially as heretofore in making carriage-wheels, and the inner metallic tire D being shrunk permanently upon so as to cover or overlie the outer cylindrical surface of the felly C, as shown in the annexed drawings, and permanently secure the felly and spokes together and to the hub or nave A independently of the outer metallic tire E, which latter surrounds and overlies or covers the outer cylindrical surface of the inner tire, as shown in the annexed drawings, and thereby protects the inner tire from wear and forms the thread of the wheel, and is shrunk or otherwise closely fitted to the inner tire D, and is secured in place thereon by means of screw-bolts F, passing radially through the two tires and the felly, as represented in the drawings, but yet so that the outer tire may be removed when worn out and another put in its place without removing or disarranging the inner tire D, and consequently without allowing the felly and spokes to become loosened during the operation of changing the tire, which is subjected to wear.

My improved wheel is more especially intended for use under heavy coaches and city railway-cars drawn by horses, or where it is requisite that the wheels should be of small diameter and as light as possible, and at the same time have a little elasticity, and a tire which will wear a very long time and which is capable of being removed from the wheel and replaced by another. It is therefore very important that the wheel should be of wood, and that the iron tire should be very heavy; but when a single tire of the requisite thickness for such wheels is shrunk upon the wooden wheel in the manner commonly practiced in putting the tires on wagon-wheels, so as to both hold the felly and spokes together and to the hub, and also form the tread of the wheel, the tire must then be heated so hot in order to obtain enough shrinkage, and can only be cooled so slowly on account of its great thickness, that it is very difficult or impracticable to prevent the wooden felly from being so burned or charred by the heated tire as to finally leave the tire too loose on wheels of such small diameter and heavy tires as are suitable for use under railroad-cars, and in such cases it is also very difficult to make the tire fit tightly upon or conform exactly to the circumference of the wooden felly; but by having two tires arranged upon the wheel, as represented in the annexed drawings—one tire D to hold the wheel together and the other tire E to form the tread and receive the wear of the wheel—the inner tire D may then be so thin that it will readily conform to the periphery of the wooden felly C, and may be cooled thereon almost instantly, or before it can injuriously burn or char the felly; and the heavy outer tire E, which forms the tread of the wheel, can then be shrunk tightly around the inner tire by merely heating the outer one a very little or to a much lower degree than would be necessary if that tire were applied directly to the wooden felly; and the inner tire protects the wooden felly from being burned or charred by the heated outer tire in applying the latter to the wheel; and with two tires on the wheel, as represented in the annexed drawings, when the outer tire becomes worn out and is removed from the wheel, the wooden felly and spokes are still squeezed and held firmly together and to the hub by the inner tire D, which is to remain permanently on the felly, as shown in Fig. 4, so that a new tire can be readily put on over the inner one; but when a wooden wheel has only a single tire shrunk upon it in the usual manner, so as to hold the felly and spokes together and to the hub, and also form the tread of the wheel, it is impossible to take off that tire without thereby releasing the wooden felly and spokes, so as to allow them to expand and spring about, and thus render it far more difficult to replace the tire on such a wheel than to replace the outer tire on my improved wheel, in which the spokes and felly are permanently held together by the inner tire.

I am aware that car and carriage wheels have been heretofore composed of wood and iron and with tires fastened on by screw-bolts, so as to be removed when worn out and replaced by others; but without two tires, one overlying the other, the inner one permanent and the outer one removable; and I am also aware that the rims of car and carriage wheels have been shrunk upon iron wheels variously constructed; but a car or carriage wheel having a wooden hub, wooden spokes, and a wooden felly, and two metallic tires with one tire overlying the others, as represented in the annexed drawings, and the inner tire permanent and the outer one removable, I believe is new, and to such a wheel I limit my claim.

What I claim as my invention, and desire to secure by Letters Patent, is—

A car or carriage wheel having a wooden felly, spokes, and hub, and two metallic tires D E, with one tire overlying the other, as herein specified and represented in the annexed drawings, and the outer tire removable without disarranging the inner one.

WALTER YOUMANS.

Witnesses:
A. PICARD,
A. F. PARK.